Figure 2:
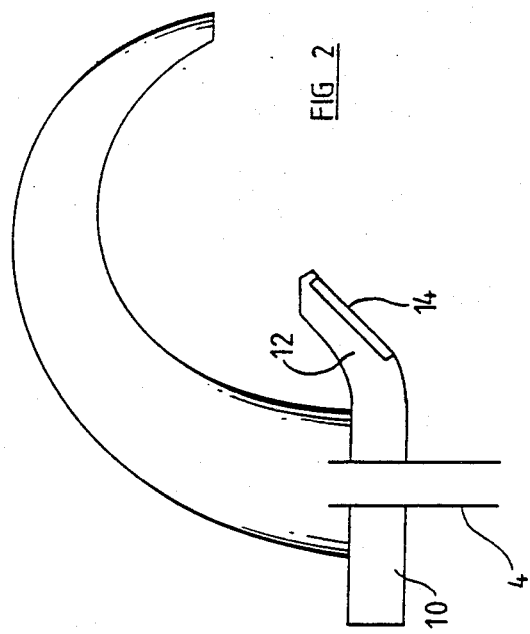

United States Patent [19]

Brondolino et al.

[11] Patent Number: 4,981,158
[45] Date of Patent: Jan. 1, 1991

[54] NON-CONTACT CONTROL

[76] Inventors: Rose M. Brondolino, 11 Thoresby Grove, Ivanhoe, 3079, Victoria; Anthony Dedda, 4 Benbrook Avenue, Box Hill North, 3129, Victoria; Charles Brondolino, 4 Oakdene Place, East Ivanhoe, 3079, Victoria; Robin J. Batty, 4 Lawrence Court, Warrandyte, 3113, Victoria, all of Australia

[21] Appl. No.: 473,933
[22] PCT Filed: Aug. 26, 1988
[86] PCT No.: PCT/AU88/00328
  § 371 Date: Feb. 27, 1990
  § 102(e) Date: Feb. 27, 1990
[87] PCT Pub. No.: WO89/02012
  PCT Pub. Date: Mar. 9, 1989

[30] Foreign Application Priority Data

Aug. 27, 1987 [AU] Australia .............................. PI4006

[51] Int. Cl.$^5$ .......................... E03C 1/05; G05D 7/06
[52] U.S. Cl. .......................... 137/624.11; 251/129.04
[58] Field of Search ...................... 137/624.11, 624.12; 251/129.04

[56] References Cited

U.S. PATENT DOCUMENTS

| | | | |
|---|---|---|---|
| 3,151,340 | 10/1964 | Minoru | 251/129.04 UX |
| 3,333,160 | 7/1967 | Gorski | 251/129.04 UX |
| 3,551,919 | 1/1971 | Forbes | 251/129.04 UX |
| 4,682,628 | 7/1987 | Hill | 251/129.04 X |

Primary Examiner—Alan Cohan

[57] ABSTRACT

Control means is provided for non-contact equipment such as a solenoid valve (2) controlling water flow from a faucet (6). The control means comprises a motion detector based on strip antennae (14, 15) which transmit and receive microwave frequency electromagnetic radiation into and out of a preselected detection volume (18). A receiving circuit (16) of the control means may be adjusted so as to vary the detection volume (18), and is provided with a timing means (24) which insure sustained operation of the equipment even when the motion detected in the detection volume (18) is sporadic. The means finds particular application to faucets such as those used to supply water to sinks or basins.

11 Claims, 10 Drawing Sheets

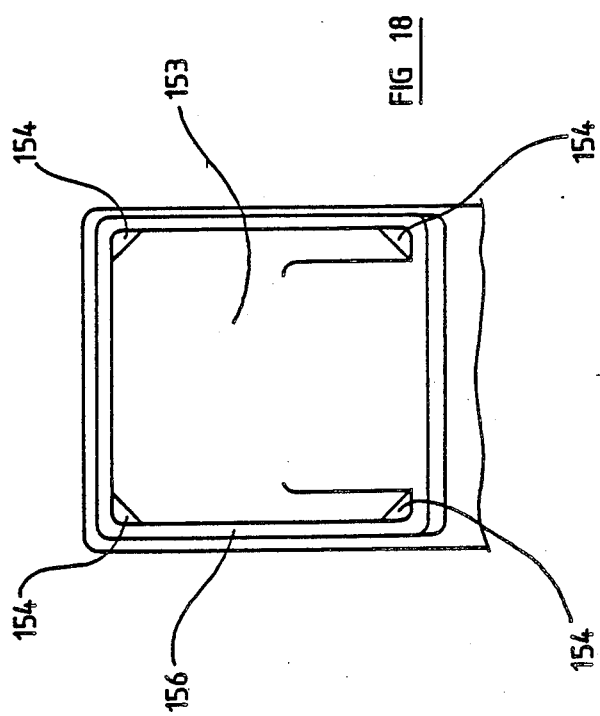

NON-CONTACT CONTROL

This invention relates to non-contact control of equipment especially but not exclusively of valves for water supplies.

More particularly, the invention relates to non-contact control of valves in faucets such as those used for supplying water to a hand-basin. The general object of the invention is to provide a relatively simple and cheap non-contact controller for a valve.

According to the present invention there is provided control means for a controllable device, such as a solenoid valve, comprising detection means for detecting movement of an object, a receiving circuit for producing motion signals in response to detected movement, signal generating means for generating control signals for controlling the device in response to said motion signals, and timing means for use in generating said control signals in a predetermined manner with reference to said motion signals, characterised in that the detection means comprises transmitting and receiving strip antennae for radiating and receiving microwave frequency electromagnetic signals into and from a predetermined detection volume.

Such control means is particularly advantageous in controlling a flow controller for a water supply line. It can be arranged to control water supply to a sink or basin, a bath, a shower, or other fixture, the detection volume being selected such that water supply can be regulated in a convenient and efficient fashion. For instance, the strip antennae may be used so as to generate a detection volume which lies substantially or entirely within a sink or basin. This can avoid accidental triggering of a water supply by motion of an object close to the control means which is not however intended to be a washing activity.

A problem with some known arrangements for automatic water supply equipment designed to trigger water flow on detection of motion has been a risk that the flowing water coming from a faucet, or flowing across the bottom of a container, itself is recognised by the equipment as a moving object so that the water flow becomes self-perpetuating. It has been found that control means according to the present invention can have additional advantages in this respect. By using electromagnetic signals having a wavelength in the range from 2 to 3 GHz, and more especially in the range from 2.4 to 2.5 GHz, rather than for instance higher frequency signals of 5 or 10 GHz, the sensitivity of the control means in detecting the water flow has been found to be particularly low.

Another advantage of using signals having wavelengths in the ranges indicated is that contamination, by for instance soap or condensation, on the antennae or on a panel immediately covering the antennae, has relatively little effect on the performance of the control means.

It has been found beneficial that the faucet should have an aerator provided. In spite of the flow of a stream of water from the faucet, an aerator has been found to reduce the risk that the water flow itself should be detected by the control means.

Another factor in reducing the risk that the stream of water from a faucet should itself be detected is the relative positions of the strip antennae and the stream of water. It has been found that arrangement of the antennae in a plane which lies at an angle in the range from 40° to 50° to the stream of water reduces said risk. Preferably, a plane parallel to the antennae should extend at about 45° to the direction of the stream.

It is also preferable that the receiving circuit of the control means should include sensitivity control means which can be used to preselect the size of the detection volume. Such sensitivity control means can be used to further reduce the risk that flow of water across the sides or bottom of a container such as a sink or basin will be detected as a moving object, and to adjust the control means to have an associated detection volume suitable to a particular installation.

Preferably, where the device comprises a flow controller for a water faucet, the timing means comprises a first timing circuit which responds to a motion signal or each of a series of motion signals to set a first predetermined period, and a second timing circuit which responds to a motion signal or the first of a series of motion signals to set a second predetermined period which is longer than the first predetermined period, the flow controller receiving control signals such that the water faucet delivers water only when first and second predetermined periods coincide.

Preferably the first predetermined period is in the range from two to five seconds, and more preferably is three seconds. This period means that water flow will be continuous rather than sporadic, even though for instance a user's hands might not move continuously, as long as the user's hands move again within the period set.

The second predetermined period ensures that should a fault condition occur the water flow does not continue indefinitely. In this respect it is preferred that the second predetermined period is in the range from 60 to 120 and preferably 90 seconds.

Figure 1:
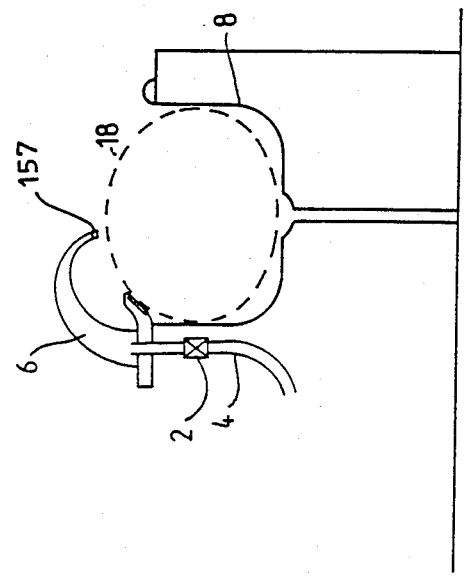
Figure 3:
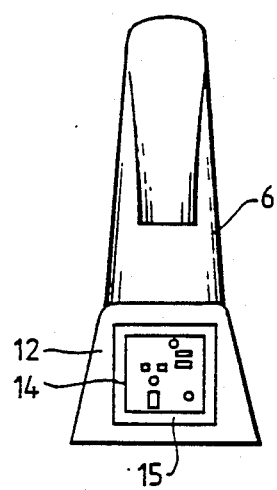
Figure 4:
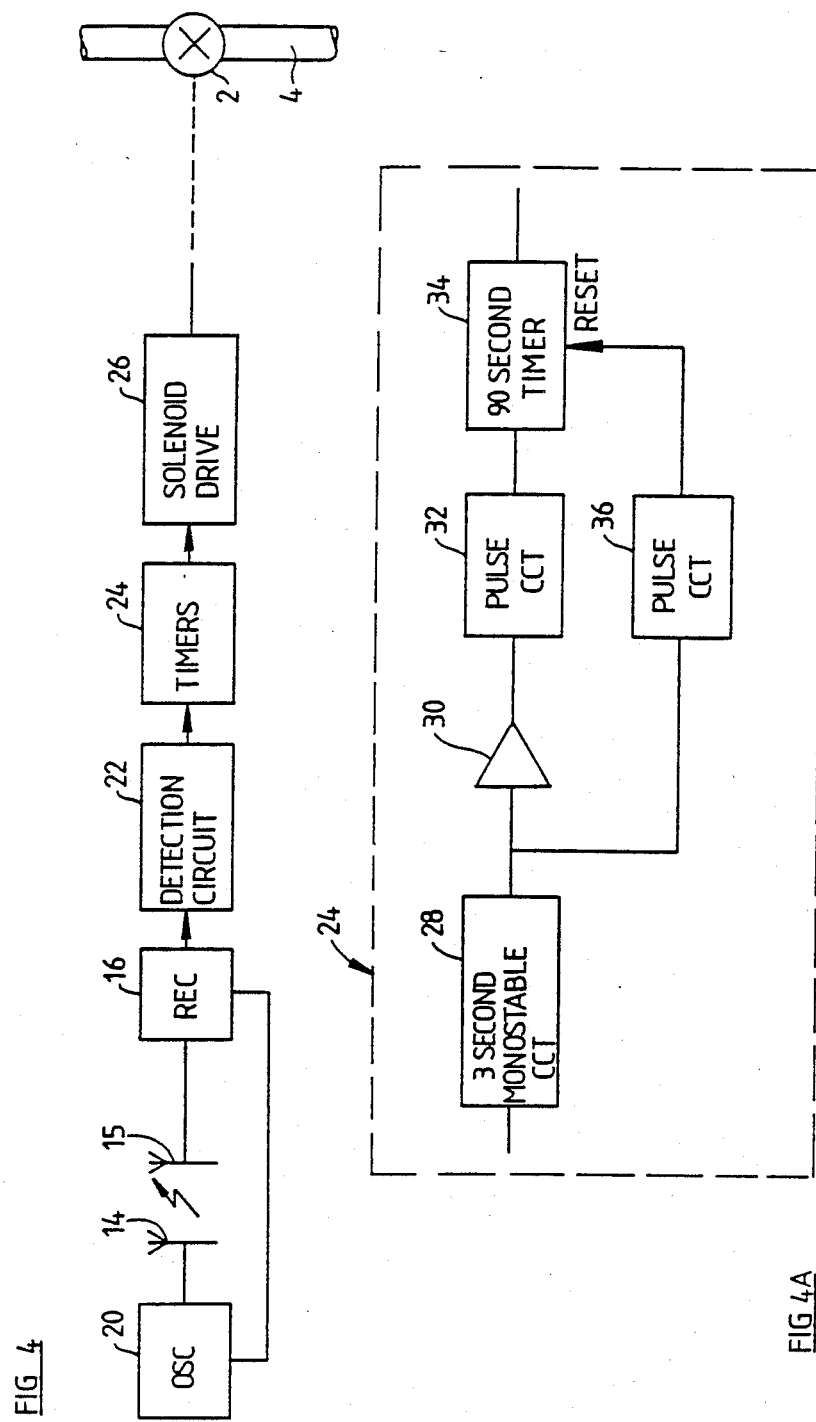
Figure 5:
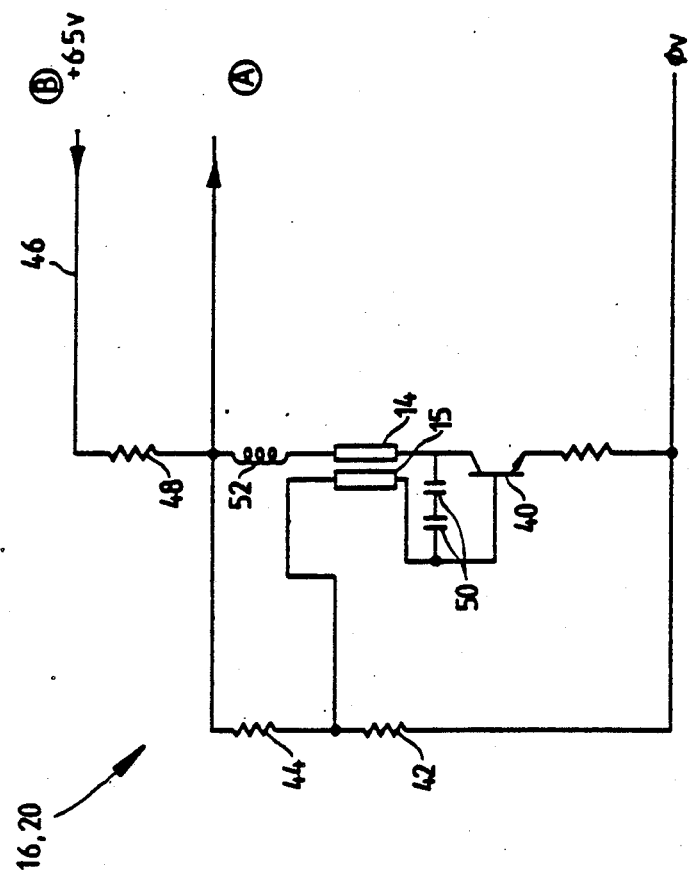
Figure 6:
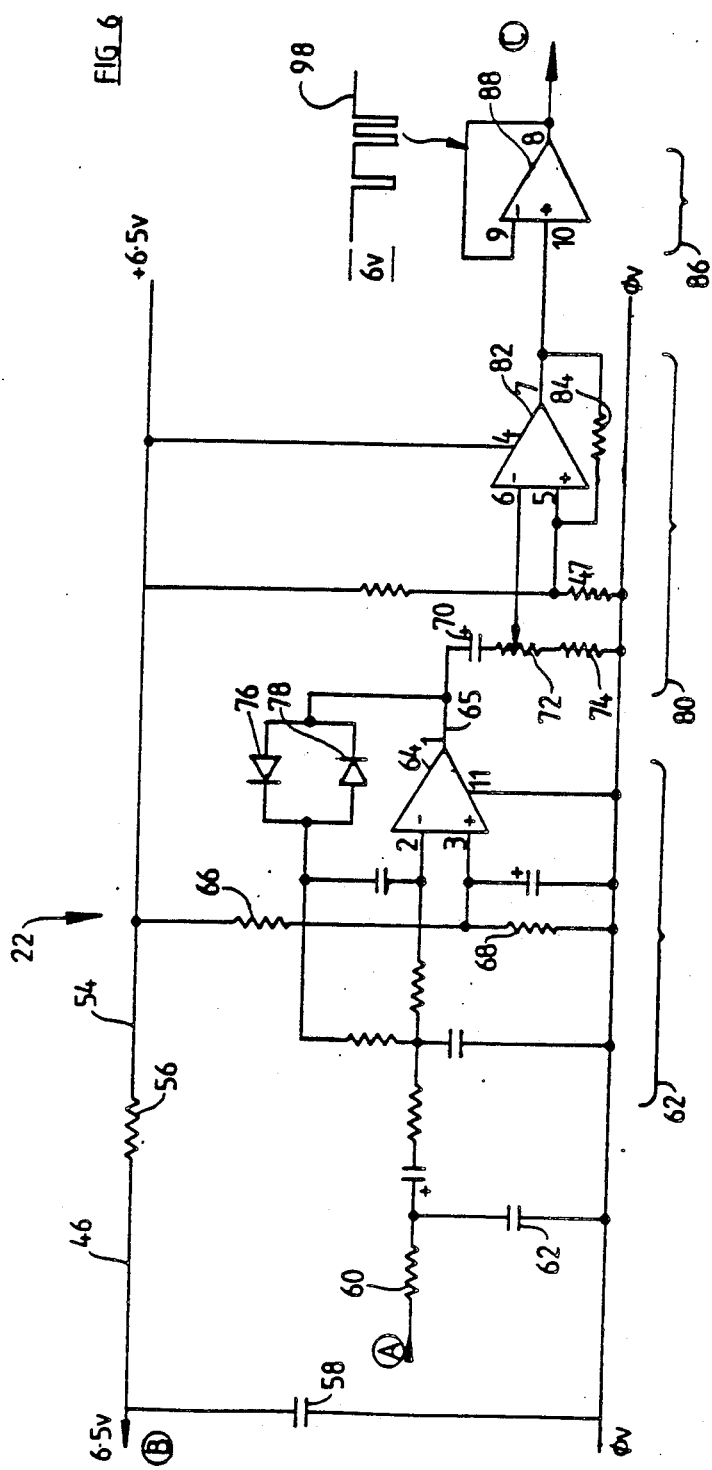
Figure 7:
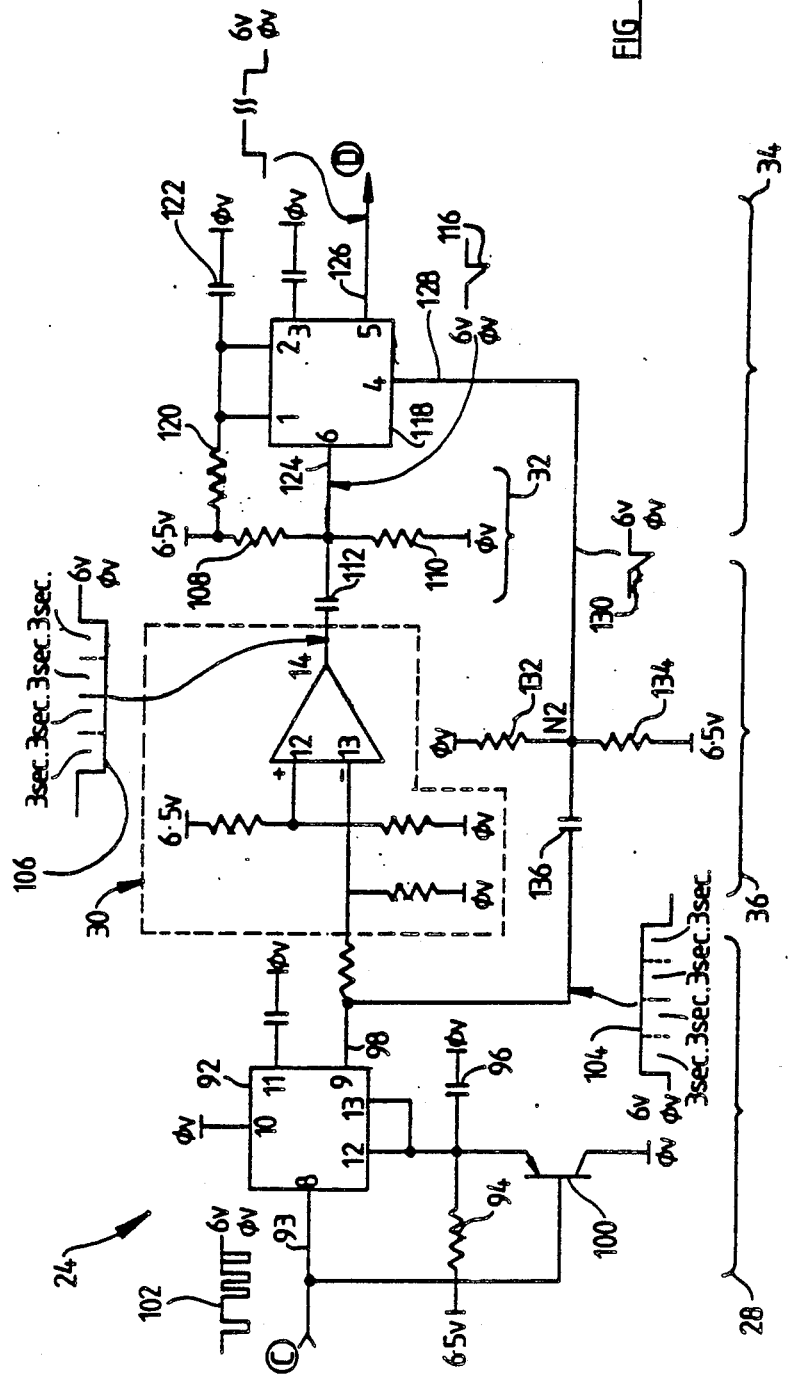
Figure 8:
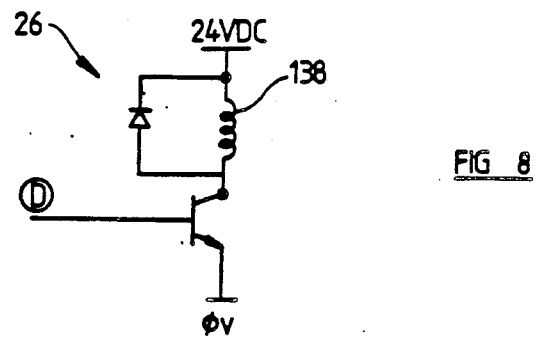
Figure 9:
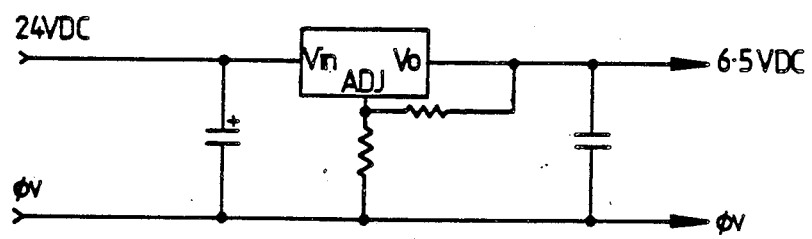
Figure 16:
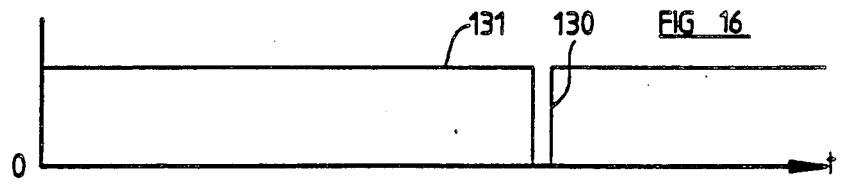
Figure 17:
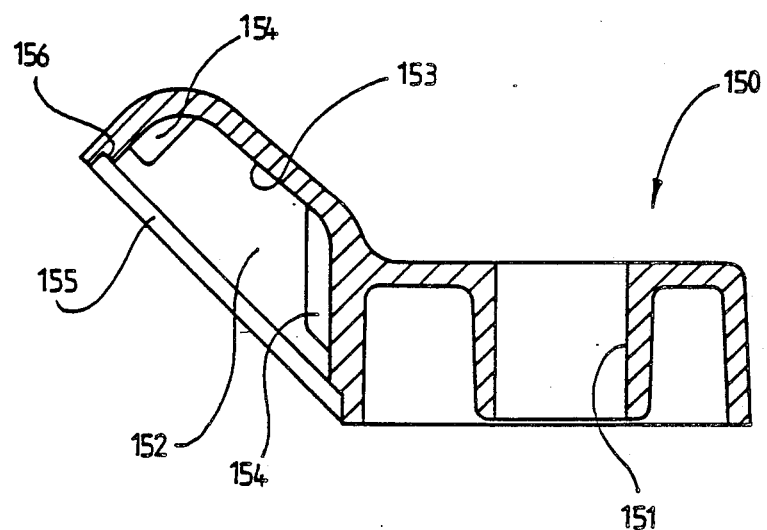

The invention will now be further described with reference to the accompanying drawings, in which:

FIG. 1 is a schematic view of a hand-basin and faucet incorporating the invention, FIG. 2 shows a more detailed side view of the faucet, FIG. 3 is a front view of the faucet, FIG. 4 is a block diagram showing broad details of the control circuitry, FIG. 4A is a block diagram of the timer circuit, FIG. 5 is a circuit diagram of the radar transceiver, FIG. 6 is a circuit diagram of the detection circuit, FIG. 7 is a circuit diagram showing timing circuits, FIG. 8 is a circuit diagram of the solenoid driver, FIG. 9 is a power supply for the circuits, FIGS. 10 to 16 show waveforms of signals, FIG. 17 is a vertical cross section of a holder for the radar transceiver, and FIG. 18 is a view from below of part of the holder.

FIG. 1 shows diagrammatically the use of a device of the invention for controlling a valve 2 in a water supply line 4 connected to a faucet 6 mounted above a hand-basin 8. The faucet 6 is provided with an aerator 157 of known type, positioned at its outlet to smooth the flow of water from the faucet 6. As best seen in FIGS. 2 and 3 the faucet 6 includes a hollow base 10 with a panel 12 which projects at about 45° from the base. The panel has mounted thereon strip antennae 14 and 15 for transmission and reception of radar frequency signals. The signals are radiated into a control zone 18 delineated by broken lines in FIG. 1 generally within the hand-basin 8 and beneath the outlet of the faucet 6. Reflected signals on the receive antenna 15 are used to determine whether any object is moving in the zone 18. Subject to control functions which will be described hereinafter, if there is motion detected in the zone 18, the valve 2 is opened so that water flows from the supply line 4 through the faucet 6 into the hand-basin 8. In this way users can wash their hands without the need to touch any fixture.

Referring to FIGS. 17 and 18, the orientation of the panel 12 is controlled by a holder 150 which is used to mount the panel 12 in relation to the faucet (the panel 12 and faucet are not shown in FIGS. 17 and 18). The holder 150 also plays a part in controlling the shape of the zone 18.

In more detail, the holder 150 comprises two main portions, one having a bore 151 therethrough for receiving the base part of the faucet 6, and the other providing a cavity 152 with a planar back 153. The cavity 152 is substantially square in cross section and has an internal projection 154 at each corner, the projections 154 stopping short of the mouth of the cavity 152. The projections 154 are designed to provide a seat for the panel 12 across the mouth of the cavity 152 which mouth is also provided with a recess 156 to receive a cover 155 to protect the panel 12 in use.

A panel 12 seated on the ends of the projections 154 is tilted in relation to the planar back 153 of the cavity 152. When mounted on a faucet, the panel 12 is at 45° to the horizontal but the planar back 153 is at only 40° to the horizontal. The cavity 152 provides, in use, a 10 mm distance at its highest end between the planar back 153 and the panel 12, and a 15 mm distance at its lowest end. This arrangement of the cavity 152 and panel 12 has been found to create a particularly suitable zone 18 for use in a hand-basin, the zone 18 being created in part by reflection of radiation at the planar back 153. The 10 mm and 15 mm distances have been found to be minimum dimensions necessary for good performance of embodiments of the invention operating as described at 2.45 GHz.

The panel 12 itself is square, having a side just under 5 cm long, and the cavity 152 and projections 154 are designed to seat such a panel.

The material of the holder 150 is brass although other materials may be substituted. However, the planar back 153 necessarily comprises material which will reflect the radiation emitted by the panel 12.

FIG. 4 shows a block diagram of one form of control circuitry incorporating the invention. The circuit includes an oscillator 20 for producing radar signals say of the order of 2.5 GHz at a power of say 1 m watt. The oscillator 20 and associated circuitry can be located in the base 10 and set in epoxy resin for water proofing. The signals are applied to the transmitting antenna 14 and radiated into the hand-basin 8, as mentioned previously. Reflected signals are picked up by the receive antenna 15 and passed to a detection circuit 22 which processes the received signal and output from the oscillator so as to detect movement of an object in the zone 18 by the well known doppler shift technique. Output from the circuit 22 passes to a timer circuit 24 which carries out a number of timing operations to properly control operation of the valve 2. Output from the circuit 24 passes to a solenoid drive circuit 26 which includes the coil for the solenoid valve 2.

Broadly speaking, the circuit functions as follows. The receive circuit 16 produces a voltage signal the amplitude of which depends upon the frequency of reflected signals received by the receive antenna 15 relative to the frequency of the oscillator 20. The detection circuit 22 processes the received signal and produces a pulsed output signal, the pulses of which represent motion detected by the receive circuit 16. The pulse train is applied to the timer circuit 24 which includes a first timer 28 which functions as a three second monostable circuit which is triggered by each received motion pulse as seen in FIG. 4A. Output from the first timer passes to a second timer 34 via an inverting amplifier 30 and pulse circuit 32. The timer 34 is in the form of a 1-shot 90 second timer which commences timing on receipt of output from the first timer. Output from the second timer is amplified and used to control the solenoid drive 26 for the valve 2. Thus when motion is first detected, the first timer 28 will ensure that continuous operation occurs for periods of at least three seconds but the operation of a second timer 34 will ensure that the valve does not remain open for more than 90 seconds. The timer circuit 24 is arranged so that the second timer 34 cannot be reset for at least three seconds after the motion pulses applied to the first timer have ceased. Pulses from pulse circuit 36 are used to reset the timer 34 as described later.

FIG. 5 illustrates in more detail one circuit realisation for the oscillator 20 and receiver circuit 16. This circuit functions in a similar way to that disclosed in Australian Patent No. 571172 and need not be described in detail. The circuit includes a transistor 40 coupled by biasing resistors 42 and 44 to a voltage supply line 46 via a 1K ohm resistor 48. The transistor 40 has capacitors 50 connected between its base and collector. The collector circuit includes the antenna 14 and coil 52. The values of the inductance of the coil 52 and capacitors 50 are chosen such that the transistor will oscillate at a centre frequency of 2.45 GHz. The current is such that about 1 m watt of power is radiated from the antenna 14. The receive antenna 15 is connected between the junction of the resistors 42 and 44 and the base of the transistor 40.

The signal received by antenna 15 varies the base current to the transistor 40 and this variation is amplified and inverted by the transistor and appears in its tuned collector circuit. Depending on the phase of the received signal, the amplified signal either enhances or opposes the oscillator signal in the collector circuit of the transistor, causing the oscillator to demand more or less current from the supply line 46. This current variation is reflected in the resistor 48 so the voltage across it varies according to the phase and amplitude of the received signal.

Figure 10:
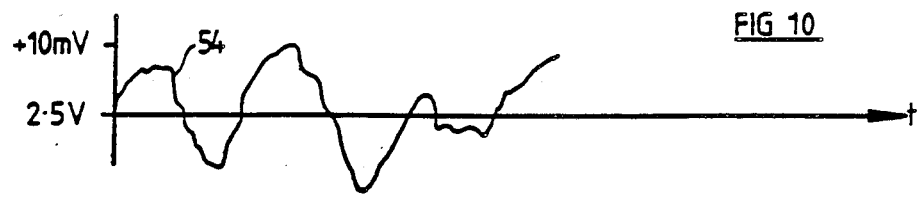

Waveform 54 of FIG. 10 depicts a typical signal at point A, the junction of the resistor 48 and coil 52. The signal has 10 mv excursions, at the Doppler frequency, about a 2.5 v DC ambient level.

The circuits of FIGS. 5 and 6 join at ground, and points A—A and B—B. It will be noted that the supply line 46 is connected to a 6.5 volt rail 54 via resistor 56. A capacitor 58 is connected from the line 46 to ground and the resistor and capacitor 56 and 58 serve to decouple any stray RF signal to ground.

The Doppler signal from the transceiver is applied to point A, via an impedance matching resistor 60 and DC blocking capacitor 62, and is passed to an active low pass filter network 62 which includes operational amplifier 64. The filter network 62 passes all frequencies below about 30 Hz and amplifies the passed signals by a factor of about 30. These signals represent detected motion within the zone 18. Resistors 66 and 68 form a voltage divider to apply the correct DC level to pin 3 of amplifier 64. The amplified Doppler signal appears on output 65 of the amplifier and is applied, via a DC blocking capacitor 70, to a voltage divider formed by resistors 72 and 74. Diodes 76 and 78 form a clipping circuit to ensure that the voltage at resistor 72 is not driven too far negatively by the charging and discharging of capacitor 70.

The circuit 22 includes a sensitivity adjustment network 80 to provide sensitivity of the radar range and also signal hysteresis to avoid chattering. The network 80 can thus be adjusted to control the effective boundary of the zone 18. The network 80 includes an operational amplifier 82 and the resistor 72, which is variable, and is adjusted to couple the appropriate doppler signal level into one input of the amplifier 82. A resistor 84 is coupled from the output of the amplifier 82 to another input so as to provide feedback for signal hysteresis.

Figure 11:
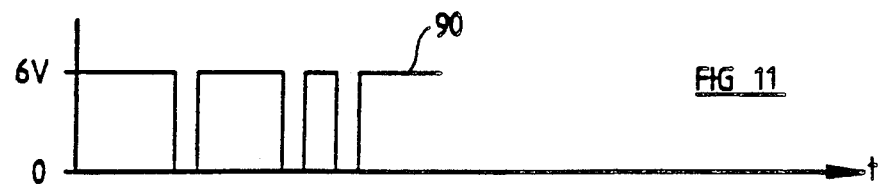

The circuit 22 also includes a voltage follower circuit 86 to provide signals at suitable levels for the timing circuit 24. The follower circuit 86 includes an operational amplifier 88 which operates to produce a pulsed output indicative of detected motion in the zone 18. The waveform 90 of FIG. 11 shows a typical output from the amplifier 88. Zero motion is represented by the 6 volt DC level and detected motion by pulses at near ground level.

The circuits of FIGS. 6 and 7 are connected at the points C—C. Thus, output from the amplifier 88 is coupled to the input of the monostable circuit 28. In the circuit of FIG. 7, the monostable circuit 28 includes a functional block 92 which is configured as a retriggerable 3 second monostable timer. Resistor 94 and capacitor 96 form an RC network which provides a 6 volt DC level at output 98 for 3 seconds duration each time the input 93 of block 92 is triggered by a ground level pulse. A transistor 100 is used to rapidly discharge the RC network whenever a trigger pulse is applied to the input 93 and therefore to recommence the 3 second duration of the 6 volt DC level at the output 98 of the block 92. Consequently, whenever motion pulses occur at the input 93, the output 98 will be at the 6 volt DC level and will remain there so long as motion pulses arrive within 3 seconds. Should no motion pulse arrive within 3 seconds of its predecessor, the output will drop to ground level.

Figure 12:
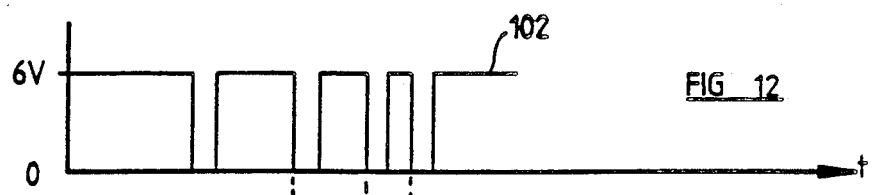
Figure 13:
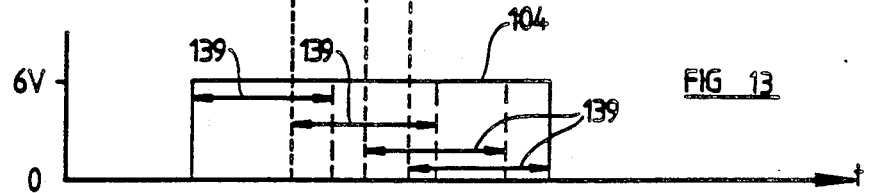

Waveform 102 of FIG. 12 represents the signal at point C, which is the signal applied to input 93. Waveform 104 of FIG. 13, shown schematically in FIG. 7, represents the signal at the output 98 of the block 92 and is shown for the case in which the pulses have occurred within 3 seconds of the preceding pulses. As mentioned previously, this allows for continuous flow of water from the faucet 6 even during periods where the hands remain stationary within 3 second periods, the 3 second periods 139 established by the individual pulses effectively overlapping with each other.

Figure 14:
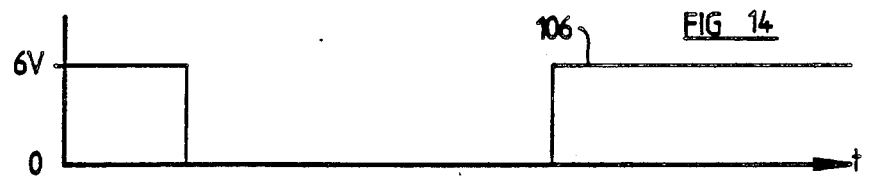
Figure 15:
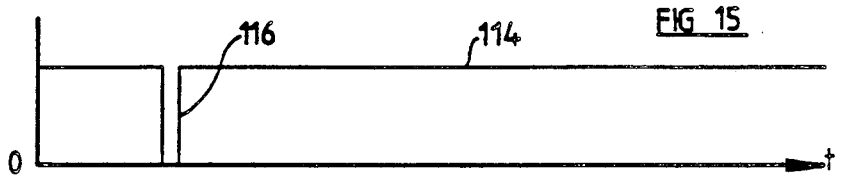

Output from the first timer circuit 28 is coupled to the amplifier 30 which inverts the waveform as shown by waveform 106 of FIG. 14.

Output from the amplifier 30 passes to the pulse circuit 32 and then to the input of the second timer circuit 34. The pulse circuit 32 includes resistors 108 and 110 and capacitor 112. These components will generate a ground level trigger pulse (typically μs duration) from the leading (negative going) edge of the output of the amplifier 30. This is represented by waveform 114 in FIG. 15 which includes trigger pulse 116.

The second timer circuit 34 includes a functional block 118 which is configured as a once only (one-shot) 90 second timer as determined by the valves of resistor 120 and capacitor 122. It is triggered by a ground level pulse 116 applied to its input 124. On receipt of the pulse the output 126 will rise to the 6 v DC level and remain there for 90 seconds, regardless of whether any other ground level pulses 116 are applied to its input 124. After 90 seconds duration, the output 126 will return to ground level. However, the duration of the output level (6VDC) at the output 126 can be shortened at any time by a ground level pulse being applied to its reset input 128.

The reset input 128 is connected to the output of the pulse circuit 36 which is arranged to produce negative going pulses 130 at the trailing edge of the output from the timer circuit 28, as shown in waveform 131 of FIG. 16.

The pulse circuit 36 includes resistors 132, 134 and capacitor 136, the capacitor being connected to the output 98 of the block 92.

Consequently, the output 126 will be triggered by the beginning of a train of hand movement pulses (waveform 104) and reset by the discontinuance of hand movement by the end of waveform 104. Thus water will flow smoothly even during sporadic hand movement (within 3 seconds) and be closed off by the cessation of movement. However, should hand movement continue for more than 90 seconds (or some other phenomenon causes unintended motion pulses) the reset function applied to reset input 128 of block 118 will not occur. In this case water flow is stopped by the output 126 going to ground level after 90 seconds, and cannot recommence until motion pulses have ceased for at least 3 seconds as determined by pulses 130 generated in response to the output 98 of the block 92.

The output 126 is connected to the input of a solenoid drive circuit 26 one example of which is illustrated in FIG. 8. The circuit 26 includes a coil 138 which operates the valve 2 in the water supply line 4.

FIG. 9 shows a suitable circuit for generating a 6.5 volt DC level for application to the supply rail 54.

Many modifications will be apparent to those skilled in the art without departing from the spirit and scope of the invention. For instance, the output from the timer circuit 24 could be used to control equipment other than a solenoid or solenoid valve for appropriate control action in response to detected movement.

What is claimed:

1. An automatically controlled faucet comprising a solenoid valve (2) coupled in a water conduit (4) to the faucet, detecting means for detecting movement of an object in a predetermined detection volume (18), said detecting means including transmitting and receiving strip antennae (14, 15) for radiating and receiving microwave frequency electromagnetic radiation into and from said predetermined detection volume, a receiving circuit (16, 22) coupled to the receiving strip antennae for generating motion signals on receipt of microwave frequency radiation indicative of the movement of an object in said detection volume, control means (24, 26) for controlling the solenoid valve, said control means including first and second timing circuits (28, 34) and a solenoid drive circuit (26), which, when activated opens the solenoid valve, the first timing circuit (28) being responsive to substantially the first of said motion signals to produce an enable signal of a first predetermined duration and to produce successive said enable signals whilst motion signals continue to be applied to the first timing circuit, the second timing circuit comprising a monostable circuit of a second predetermined period which is longer than said first predetermined period, the output of the monostable circuit being coupled to the solenoid drive circuit, the second timing circuit being triggered by the commencement of said enable signals to thereby activate the solenoid drive circuit, and wherein the second timing circuit is reset by cessation of said enable signal or signals, the arrangement being such that:

(i) if the enable signals cease prior to the expiration of the second predetermined period the monostable circuit is reset and the solenoid drive circuit is deactivated and;

(ii) if the enable signals cease after the expiration of said second predetermined period the output of the monostable circuit changes state and deactivates the solenoid driver circuit and wherein the monostable circuit cannot be reset until the enable signals cease.

2. A faucet according to claim 1 wherein the faucet includes a base (10) for mounting the faucet on a hand basin and the detection volume (18) lies at least partially in said hand basin (8).

3. A faucet according to claim 2 wherein the base includes a panel and wherein the antennae (14, 15) are mounted in the panel (12), radiation being transmitted forwards of the panel (12) both directly from the transmitting antenna (14) and indirectly via a reflector (153) mounted to the rear of said antenna (14).

4. A faucet according to claim 3 wherein the receiving circuit (16, 22) includes sensitivity control means (80) which controls its sensitivity so as to preselect the size of the detection volume (18).

5. A faucet according to claim 4 wherein the sensitivity control means (80) preselects the size of the detection volume (18) to lie wholly within the hand basin.

6. A faucet according to claim 4 wherein the sensitivity control means (80) comprises an operational amplifier (82) and a variable resistor (72), the sensitivity control means (80) being adjustable so as to preselect the detection volume (18).

7. A faucet according to claim 1 wherein the frequency of the electromagnetic signals lies in the range from 2 to 3 GHz.

8. A faucet according to claim 7 wherein said frequency lies in the range from 2.4 to 2.5 GHz.

9. A faucet according to claim 1 wherein the strip antennae (14, 15) are mounted in a plane which lies at an angle in the range 40° to 50° to the horizontal.

10. A faucet according to claim 9 wherein said plane lies at 45° to the horizontal.

11. A faucet according claim 1 wherein the outlet of the faucet is provided with an aerator.

* * * * *